US006319353B1

(12) United States Patent
Müssig

(10) Patent No.: US 6,319,353 B1
(45) Date of Patent: Nov. 20, 2001

(54) SELF- ADHESIVE PROTECTIVE FILM

(75) Inventor: Bernhard Müssig, Seevetal (DE)

(73) Assignee: Beiersdorf AG, Hamburg (DE)

( * ) Notice: Subject to any disclaimer, the term of this patent is extended or adjusted under 35 U.S.C. 154(b) by 0 days.

(21) Appl. No.: 09/114,795

(22) Filed: Jul. 13, 1998

(30) Foreign Application Priority Data

Jul. 15, 1997 (DE) .............................................. 197 30 193

(51) Int. Cl.$^7$ .............................. C09J 7/02; C09J 123/10; C09J 123/20
(52) U.S. Cl. .................................... 156/334; 428/355 EN; 428/353; 428/354; 428/343; 428/515; 428/517
(58) Field of Search ............................. 428/355 EN, 353, 428/343, 354, 515, 517, 516; 156/334

(56) References Cited

U.S. PATENT DOCUMENTS

| | | | |
|---|---|---|---|
| 5,034,269 | * | 7/1991 | Wheeler .............................. 428/317.3 |
| 5,518,786 | * | 5/1996 | Johnson et al. ...................... 428/40.6 |
| 5,567,515 | * | 10/1996 | Koga et al. ........................... 428/355 |
| 5,601,917 | * | 2/1997 | Matsui et al. ........................ 428/356 |
| 5,643,676 | | 7/1997 | Dobashi et al. . |

FOREIGN PATENT DOCUMENTS 661364   7/1995   (EP) .

* cited by examiner

*Primary Examiner*—Daniel Zirker
(74) *Attorney, Agent, or Firm*—Norris McLaughlin & Marcus

(57) ABSTRACT

Self-adhesive protective film for the exterior of painted vehicles, especially cars, characterized in that the backing of the protective film is a film, the UV permeability in the range from 290 to 400 nm is below 1%, the bond strength on steel is between 0.2 and 2.8 N/cm and the adhesive composition consists of a copolymer comprising at least two different α-olefins having 2 to 12 carbon atoms and at least one further comonomer, no α-olefin having a proportion of 75 mol-% or more in the adhesive composition as a whole.

15 Claims, No Drawings

SELF-ADHESIVE PROTECTIVE FILM

The invention relates to a self-adhesive protective film for protecting the fresh paint finish of vehicles such as cars and for protecting freshly painted vehicle components against soiling and damage during assembly, transportation and storage, and to its use on vehicles, especially on cars.

The preservation and protection of motor vehicles in the course of transportation from manufacturer to dealer has long been common practice.

It is known that, in order to preserve cars, paraffin waxes are applied in a thickness of from 5 to 20 μm. However, it has been found that, especially on horizontal areas of the vehicles, a thin and usually non-uniform layer of this nature does not afford adequate protection against external influences such as, for example, the corrosive action of bird droppings.

A considerable disadvantage of sealing with paraffin wax is the need to remove the preservative using a steam jet, surfactants or solvents. Environmentally sound recovery and disposal of the residues are the cause of great complexity in terms of apparatus, and very high costs.

Self-adhesive surface protective films for motor vehicles have also been known for some time. In most cases these are permanently adhesive films for protection and decoration, for example a stone-chip protective film. These self-adhesive films remain permanently on the vehicle following their application.

Reversibly adhering self-adhesive films for protecting the car during transportation have so far been used only in a few special cases and without great success. The object of the invention was to remedy this situation and, in particular, to provide a self-adhesive protective film which does not have the disadvantages of the prior art, or at least not to the same extent. This object is achieved by a self-adhesive protective film as characterized in more detail in the patent claims.

The adhesive film of the invention is a protective film for use on painted vehicles, especially cars, having an adhesive comprising a polymer of at least two different α-olefin monomers with a number of in each case from 2 to 12 carbon atoms, and at least one further comonomer, where no α-olefin should have a proportion of 75 mol-% or more, and having a bond strength of from 0.2 to 2.8 N/cm, preferably from 0.3 to 1.5 N/cm on steel (AFERA Method 4001 corresponding to DIN EN 1939). The number of carbon atoms of the α-olefins is between 2 and 12. Examples are linear alkenes, such as ethylene, propene, 1-butene, 1-hexene and 1-octene, and isoalkenes, such as 4-methyl-1-pentene; the proportion of the further comonomers (third and any other comonomers) should be below 30 mol-% if they are non-olefinic comonomers. These latter may be polar, such as vinyl acetate, esters of acrylic or methacrylic acid, vinyl chloride, vinyl ethers or acrylonitrile, or apolar, such as isobutene, styrene or an α-olefin, for example.

Too high a proportion of polar non-olefinic monomers, however, increases the sticking force to painted metal vehicle panels following storage under alternating climatic conditions. It is therefore advantageous to keep the proportion of polar comonomers below 20 mol-% and, in particular, to omit them entirely; in this case, the copolymer comprises at least three apolar monomers.

The proportion of each of the α-olefinic monomers should be below 75 mol-%; more favourable is a proportion of not more than 65 mol-%. The most suitable are terpolymers comprising three α-olefins, whose proportion of α-olefinic monomers is in each case between 5 and 60 mol-%. Limiting the proportion of individual monomers avoids increased sticking forces following storage under alternating climatic conditions, poor tack on application, and deformation of the paintwork. Deformation comprises visually perceptible, irreversible changes to the painted surface, which result when the fresh, not yet fully cured paint has been covered with an inappropriate protective film.

In order to optimize its properties, especially its adhesive behaviour on specific paints, the self-adhesive composition employed can be blended with one or more additives, such as resins, plasticizers, for example diesters or polyesters of phthalic acid, trimellitic acid or adipic acid, liquid oligomers of 1-butene and/or isobutene, mineral oils, fillers, pigments, UV absorbers, light stabilizers or anti-ageing agents, or elastomers. Examples of such elastomers are polyisobutylene, butyl rubber, hydrogenated block copolymers of styrene and dienes, or acrylate copolymers. Suitable resins are rosin esters (especially hydrogenated types), hydrocarbon resins, terpene resins or liquid tackifier resins. For some paint systems it is advantageous to add constituents of the paints to the adhesive in order to reduce the migration of paint constituents (e.g. fatty acid esters) from the paint into the adhesive composition. Paint constituents of this kind are described in more detail in EP 0 763 584 and U.S. Pat. No. 5,612,135.

It is advantageous, moreover, for recycling and energy recovery if the adhesive, in particular the entire protective film, is free from halogen.

The backing for the adhesive comprises thermo-plastic films, preferably polyolefin films. These may consist, for example, of polyethylene, polypropylene and mixtures or copolymers thereof (e.g. random copolymers). Appropriate thicknesses for the backing films are from 20 to 80 μm (including, if appropriate, the adhesion promoter layer). The softness of the backing film is relevant to the flexibility of the protective film during application; the force at 10% extension should not exceed 25 N/115 mm, preferably 16 N/15 mm, either in the lengthwise or transverse direction. On account of their stability to shrinkage under hot conditions and their good flexibility, propylene copolymers are particularly suitable. For improving the adhesion between film and adhesive it is advantageous, although not absolutely necessary, to use an adhesion promoter layer; in that case the backing film consists of the base layer and the adhesion promoter layer. The latter consists preferably of polymers comprising predominantly olefinic monomers and/or components of base layer and/or adhesive. With particular preference the adhesion promoter comprises at least one polymer of which at least 50 mol-% consists of one or more α-olefins. Examples of such polymers are ionomers based on ethylene-(meth)acrylic acid copolymer, or maleic anhydride-modified polyolefins.

In order to provide the backing film with weathering stability, it is sensible to add light stabilizers—in the case of polyolefins, this is generally vital. In the context of application to the protective film, their function is primarily to avoid embrittlement of the backing film. In the case of a multilayer backing film the protection relates in particular to the base layer. Light stabilizers of this kind are described in Gaechter and Müller, Taschenbuch der Kunststoff-Additive [Pocketbook of plastics additives], Munich 1979, in Kirk-Othmer (3.) 23, 615–627, in Encycl. Polym. Sci. Technol. 14, 125–148 and in Ullmann (4.) 8, 21; 15, 529, 676. HALS light stabilizers in particular, such as CAS Nos. 106990-43-6, 65447-77-0, 70624-18-9 or 52829-07-9, for example, are suitable for the protective film of the invention. The amount of light stabilizer should be at least 0.15, preferably at least 0.30, % by weight, based on the backing film. The use of antioxidants for the film (e.g. Irganox 1010, Ciba, or tris-nonylphenyl phosphite) is advantageous but not absolutely necessary.

The light stabilizers mentioned for the film can also be employed for the adhesive composition. Such an addition raises the ageing stability of the adhesive composition, especially under UV exposure of more than 100 kLy (kilolangleys), but is generally dispensable for applications entailing up to 6 months of outdoor weathering. In the case of the polyisobutylene homopolymer adhesives or butyl rubber adhesives which are not in accordance with the invention, such an addition is vital to prevent residues of adhesive under very severe UV exposure.

The light stability of backing film and adhesive can also be improved by other additives in the protective film, especially in the base layer of the backing film. Such an improvement can be brought about by UV absorbers (e.g. Tinuvin P, Ciba) or, primarily, by means of reflective pigments (e.g. titanium dioxide). The protective film of the invention is aimed at a high-grade branded product and therefore has a permeability for UV radiation in the range from 290 to 400 nm of less than 1%, preferably of less than 0.1%.

The adhesion promoter can be applied by coextrusion with the base film or by coextrusion with base film and adhesive or by coating onto the base film.

One advantageous embodiment is to apply the adhesion promoter simultaneously with the extrusion of the film, so that the resulting coextruded film need only be coated with the adhesive. The optimum technical solution for the protective film of the invention is the simultaneous coextrusion of film and adhesive (including, if appropriate, an adhesion promoter layer).

The particular significance of this invention, although residing inter alia in the process for preparing the protective film and in the composition of the backing film, consists primarily in the composition of the pressure-sensitive adhesive layer of the invention and in the combination of these factors.

When tested by applying them to painted metal panels and subjecting them to storage under alternating climatic conditions, known apolar uncrosslinked self-adhesive compositions show better paint compatibility than polar compositions. By paint compatibility is meant no paint deformation and ease of peel following storage under alternating climatic conditions. On the other hand, however, they are too soft (insufficiently cohesive) and exhibit residues of composition when the film is peeled off. If, therefore, such compositions are crosslinked by chemical or radiative means, they lead to unwanted paint deformation. An exception are self-adhesive compositions based on natural rubber resin, which can be peeled off again without residue and with only minor paint deformation. However, these compositions are not stable to ageing on exposure to UV radiation. This leads to severe greasy or paintlike-hardened residues on the coated metal panel following extreme stresses over a prolonged period (from three to six months) as occur, for example, in Florida.

Also known are polyacrylate compositions. If uncrosslinked polyacrylate compositions are subjected to storage under alternating climatic conditions, they exhibit good compatibility with paint surfaces. On the other hand, however, they are of such little cohesion that when the film is peeled off they leave residues of composition on the substrate. If these compositions are strongly crosslinked by radiation or chemically, they can be peeled off without residue but, on the other hand, cause permanent deformations on the paint surface and in some cases, moreover, show inadequate adhesion when bonded to curved painted areas.

Japanese Patent Application JP 02 199 184 discloses a radiation-crosslinkable pressure-sensitive adhesive which for protective use on coats of paint must be formulated with a low glass transition temperature in order to prevent permanent deformations of the paintwork. In this case there are problems owing to inadequate bond strength of the self-adhesive film to the motor vehicles in the course of application and transportation.

This also applies to acrylates as described in U.S. Pat. No. 5,612,136. The process of irradiation disclosed therein, moreover, damages the film, thus reducing its weathering stability, if irradiation is carried out for so long that the residual monomers are fully removed by polymerization. At lower doses of radiation, the content of residual monomers is so high that they migrate into the vehicle finish and thereby cause it to swell. A further disadvantage is the migration of photoinitiators into the paint, where they reduce its UV stability.

European Patent Application EP 0 519 278 discloses, for protecting cars, a film comprising a backing which is coated with a rubber-based pressure-sensitive adhesive, especially polyisobutylene, having a dynamic modulus of elasticity of from $2 \times 10^5$ to $7 \times 10^6$ $dyn/cm^2$, corresponding in SI units to a value of from $2 \times 10^4$ to $7 \times 10^4$ Pa, at 60° C. Performance tests with a self-adhesive film of this kind indicate relatively good compatibility with paint surfaces. The bond strength following storage under alternating climatic conditions on paints common in the car industry, however, is so low that the bond strength required in practice is not always adequately attained. Especially under the influence of moisture on the film, the bond strength is frequently reduced to such an extent that the film becomes detached, during transportation, from the vehicle it is protecting, so that there is no longer any protective effect. Furthermore, the self-adhesive composition shows no compatibility with the sealing rubbers (sealing profiles) which are common in carmaking; when the protective film is peeled away from window profiles, residues of the adhesive coating composition remain on the rubber. When the protective film is peeled off, edges with residues of adhesive remain, which can be traced back to the breakdown of the adhesive under UV weathering.

European Patent Application EP 0 592 913 describes a surface protection film for the transportation of cars, which is composed of a copolymer of unsaturated, polar comonomers and α-olefins, especially of EVAc. In the case of this protective film, there is no application of an additional adhesive coating. A film of this kind, while admittedly of simple construction, nevertheless displays distinct disadvantages in terms of its use. The sticking force is very low; this defect can be remedied by heating in the course of application. In addition, unless these films are provided with a protective layer or a release covering, they lead to blocking, as taught by EP 0 768 356. A particularly serious consideration is that the films described show very severe paintwork deformation and very great difficulty of removal following use.

The object, therefore, is to find an adhesive film which possesses sufficiently high initial bond strength that it can be bonded under tension (application of the adhesive film to curved areas) without becoming detached and yet following prolonged storage (up to one year under weathering) can easily be peeled off again. Accordingly, there has been no lack of attempts to remedy these deficiencies. The EVAc adhesive film described in DE 195 32 220 is markedly superior to the product described in EP 0 592 913, but when peeled off after use still shows a bond strength which is too high to allow the adhesive film to be peeled off without tears and without excessive effort by the user. With one-component paints, moreover, there is paint deformation.

The increase in bond strength following outdoor storage, which the skilled worker calls peel increase, is caused by interactions—especially polar forces— between the adhesive and the paint. The skilled worker will therefore avoid polar comonomers such as acrylate or vinyl acetate. The polyisobutylene referred to in the abovementioned EP 0 519 278 is an adhesive which is appropriate in this context. The disadvantage, however, is the ageing behaviour. Polyisobutylenes are known to be soft (of low cohesion), especially following ageing by heat or UV radiation. This leads to residues on the paint following removal. For this reason, in the case of the commercial adhesive film based on polyisobutylene, the films are highly pigmented—the destructive influence of light should be kept away from the adhesive as far as possible. In the edge region, however, the adhesive is exposed directly to UV light, which leads to severe residues there. Attempts to avoid this are made by adding antioxidants and HALS light stabilizers to the polyisobutylene; these additives are described in U.S. Pat. No. 5,601,917.

Adhesives comprising hydrogenated styrene-diene block copolymers are substantially more stable to UV, and their use is described in the utility model DE 296 04 473 U1. A significant disadvantage of such block copolymers is their thermally reversible crosslinking via the styrene domains. If an adhesive film prepared from these polymers is peeled off in the summer from a vehicle which has become warm in the sun, the adhesive to a large extent remains adhering to the paintwork, since the cohesion of the adhesive compositions is less than the adhesion to the paintwork. Heating leads to shrinkage of the protective film and, as a result, the adhesive, which is soft under hot conditions, transfers smearingly onto the metal panel at the retreating edges of the adhesive film.

EP 0 661 364 describes a surface protective film having an adhesive composition which exhibits "strong initial tack" (p. 2, line 6) and is therefore inappropriate for the purposes of the present invention; pages 3 and 6 describe bond strengths to steel of up to 1 kg/25 mm, corresponding approximately to AFERA sticking forces to steel of up to 4.0 N/cm. To limit the peel increase behaviour on exterior weathering and/or storage under alternating climatic conditions it is important to restrict the proportion of polar comonomers as a whole and to limit the proportion of each individual α-olefin monomer, which is not undertaken by the cited invention. The films described, moreover, are not light stable, since no measures are taken, such as the addition of HALS light stabilizers or light-reflective pigments, to achieve the light stabilization necessary for this utility. The use of protective film on the outside of vehicles places particularly stringent requirements in terms of light stability, especially in the UV range, so that for this reason too protective films of this kind are completely unsuited to this utility. On application to vehicles, owing to curved areas, an important part is played by the extensibility of the film: the cited invention, however, emphasizes the suitability for planar areas ("plates" and "boards") and therefore does not attempt to limit the force at 10% extension.

WO 96/37568 describes the use of polyhexene and/or polyoctene for an apolar pressure-sensitive adhesive. The polymers described in the examples exhibit little baking but nevertheless these polymers, owing to their low cohesion— caused by the low molecular weight of customary commercial polymers of this kind—likewise lead to residues, which it is attempted to avoid by adding other polymers, referred to therein as cold flow restricting agents. For practical purposes, nevertheless, these adhesives are of inadequate cohesion (are soft), which leads to residues after weathering, especially if the adhesive tape shrinks under the effect of heat.

For the skilled worker it was surprising and not foreseeable that an adhesive composition which consists essentially of a copolymer of at least three monomers, including at least two α-olefins having in each case from 2 to 12 carbon atoms and a proportion of in each case less than 75 mol-%, has the desired combination of properties:

minimal peel increase good UV resistance no paint deformation sufficient bond strength on application to curved areas high cohesion (no residues on peeling or on shrinkage of the protective film).

The very high weathering stability (resistance to UV light), in particular, is a completely surprising property.

On the one hand, these self-adhesive compositions feature good strength of adhesion to a variety of coating materials common in the automotive industry, even under the effect of moisture or humidity, with the result that the protective film does not become detached from the vehicle even under the effect of wind or under tension due to bonding to curved surfaces. Furthermore, the self-adhesive composition exhibits a sufficient bond strength within the first few minutes following application, so that after just half an hour, for example, the protective film can be exposed to a fast airstream (up to 160 km/h) and yet, on the other hand, is not difficult to remove following prolonged use. In addition, the self-adhesive composition of the invention ensures a very low unrolling force. In particular, on a 65 μm thick film consisting predominantly of EP copolymer, the self-adhesive composition of the invention shows no paintwork deformation on metal panels which have been coated with polyurethane and heat-treated at 130° C. for 30 minutes and following storage under alternating climatic conditions as detailed in Example 1 of this description.

The peel force of the protective film of the invention from two-component PU coating materials is greater than 0.1 N/cm when fresh and below 3 N/cm following storage under alternating climatic conditions (in accordance with AFERA Method 4001). In addition, irradiation of the protective film with UV light, for example with Xenotest 1200 at 55° C. for 3000 hours, leads to no impairment to the properties of this protective film. There is no embrittlement of the film, and neither does the self-adhesive composition cause paintwork deformation or discoloration and nor do residues of composition occur when the protective film is removed.

The protective film of the invention is therefore particularly suitable for protecting the fresh finish of cars during assembly or transportation, or as a protection for freshly painted steel panels during machining and transportation. In this context the protective film can be bonded just half an hour after the coated surfaces have passed through the oven, without any disadvantages whatsoever, despite the fact that at this point in time the paint has still not yet fully cured. In addition, the protective film exhibits outstanding properties when used as edge-fastening tape for the additional fastening of self-adhesive masking films of large surface area.

A further feature of the protective film of the invention is that it can be applied in a large width over the bonnet, roof and boot of cars and, owing to its flexibility, conforms very well to planar and even gently curved surfaces. It is thereby possible to protect the horizontal surfaces which are most at risk from soiling. However, even narrow areas such as, for example, the projection of the door below the windows, or bumpers, can easily be covered over. Protection of the vertical surfaces on the vehicle is particularly appropriate during its assembly.

The protective film is resistant to sunlight, moisture, heat and cold, with weathering stability of at least six months. The addition of titanium dioxide and of light stabilizers, in particular, leads to an improvement in the UV resistance of the protective film. Even very high sun levels as are encountered, for example, in Florida, do not cause the protective film to fail or detach, at least not within a period of six months.

After application of the protective film and following storage for 14 days at alternating temperatures and under the effect of weathering, the self-adhesive composition does not give rise to any deformation of the underlying paint film. In addition, the strength of the protective film in comparison to preservation with wax ensures flawless protection against soiling, such as bird droppings, and damage to the entire vehicle by minor mechanical events.

Following use, the protective film can be removed without residue and without tearing the backing film, in spite of the required, good bond strength. Even on the rubber seals used widely on cars there are no residues of adhesive following its removal. Especially if the protective film is free from halogen, material recycling thereof or energy recovery therefrom is possible.

In the text which follows, the invention will be illustrated on the basis of examples which are not, however, intended to restrict the invention.

EXAMPLE 1

A film is manufactured by flat-film extrusion in a width of 1450 mm. It consists of a 50 μm thick base layer and a 15 μm thick adhesion promoter layer. The base layer consists of 60 parts by weight of PP homopolymer, 30 parts by weight of LLDPE, 10 parts by weight of titanium dioxide and 0.3 part by weight of a HALS stabilizer (Tinuvin 770). The adhesion promoter layer consists of a maleic anhydride-grafted polyolefin.

The film has the following physical properties:

| | | |
|---|---|---|
| Overall thickness of film with adhesion promoter | 65 μm | DIN 53370 |
| Overall weight of film with adhesion promoter | 63 g/m$^2$ | DIN 53365 |
| Tensile strength, lengthwise | 30 N/mm$^2$ | DIN 53455-7-5 |
| Force at 10% extension, lengthwise | 19 N/15 mm | DIN 53455-7-5 |
| Tensile strength, transverse | 20 N/mm$^2$ | DIN 53455-7-5 |
| Extension, lengthwise | 450% | DIN 53455-7-5 |
| Extension, transverse | 450% | DIN 53455-7-5 |
| Impact strength under tension, lengthwise | 3000 mJ/mm$^2$ | DIN 53448 |
| Impact strength under tension, transverse | 200 mJ/mm$^2$ | DIN 53448 |

The adhesive prepared is a 15% strength solution of a copolymer consisting of 30 mol-% each of propene and 1-butene and 40 mol-% of 4-methyl-1-pentene with the addition of 0.1% by weight of Irganox 1070 and Chimassorb 944 in toluene, and it is applied to the film with a spreader bar and dried for 3 minutes at 80° C. in a tunnel. The resulting protective film is trimmed at the edge and wound up into rolls 200 m long and 1400 mm wide. The thickness of adhesive is 15 μm. The Mooney viscosity $M_L$ (1+8) at 125° C. was measured as 35.

The self-adhesive film produced in this way can be unwound easily and without creases and when used to protect cars can be applied without problems. Owing to the good tack and ease of correction, the bonding processes can be accelerated. After use for up to six months (period of bonding) under outdoor weathering, the self-adhesive film can be peeled off again without defects.

The protective film is characterized by the physical properties reproduced in the following table.

| | |
|---|---|
| Overall thickness of protective film: | 80 μm |
| Peel force from the two-component PU paint after 14 days of alternating climatic conditions (cycle 2 as indicated below) at a peel angle of 180° and a peel rate of 300 mm/min: | 1.5 N/cm |
| Peel force from the reverse side at a peel angle of 180° and a peel rate of 300 mm/min: | 0.1 N/cm |
| Bond strength on steel | 0.3 N/cm |
| Bond strength on paint | 0.3 N/cm |

The alternating climatic conditions comprise the following cycles:

| Cycle 1 | | Cycle 2 | |
|---|---|---|---|
| Duration [h] | Temperature [° C.] | Duration [h] | Temperature [° C.] |
| 4 | 80 | 3 | 90 |
| 4 | −30 | plus 4 times Cycle 1 | |
| 16 | 40 at 100% rel. humidity | | |

In this context, Cycle 2 is repeated a total of two times.

The protective film was bonded to freshly painted metal panels (two-component PU paint) and peeled off after a week; no paintwork deformation was in evidence. Samples bonded to paint were weathered at 97 kLy; following removal, no residues could be seen on the surface or in the edge region.

EXAMPLE 2

Preparation takes place as in Example 1 but the adhesive consists to the extent of 97% by weight of a terpolymer of 20 mol-% each of 1-butene and 4-methyl-1-pentene and 60 mol-% of propene, with the addition of 3% by weight of a tackifier (Regalrez™ 116).

The bond strength on steel is 0.25 N/cm and on paint 0.21 N/cm (fresh) and 1.0 N/cm (following storage under alternating climatic conditions), and the overall thickness is 81 μm. The protective film was bonded to freshly painted metal panels (two-component PU paint) and peeled off after a week; no paintwork deformation was in evidence. Samples bonded to paint were weathered at 97 kLy; following removal, no residues were to be seen on the surface or in the edge region.

EXAMPLE 3

A film was produced as in Example 1, the base layer consisting of 80 parts by weight of a random PP copolymer with 5.5% ethylene (Novolen 3300 MC, BASF), 10 parts by weight of LLDPE, 7 parts by weight of titanium dioxide and 0.45 part by weight of a HALS light stabilizer (Chimassorb 944, Ciba) and the adhesion promoter layer consisting of 20 parts by weight of the random PP copolymer and 80 parts by weight of LLDPE. This film was coated as in Example 1. The adhesive used is a polymer of 70 mol-% ethylene, 20 mol-% propene and 10 mol-% 1-hexene with the addition of 0.1% by weight of Irganox 1010 and 0.3% by weight of Tinuvin 770. The thickness of adhesive is 10 μm.

At 10% extension in the lengthwise direction the film exhibits a force of 14 N/15 mm. The bond strength on steel is 0.6 N/cm and on paint 0.5 N/cm (fresh) and 2.9 N/cm (following storage under alternating climatic conditions). The protective film was bonded to freshly painted metal panels (two-component PU paint) and peeled off after a week; slight deformations of the paintwork were in evidence in the edge region. Samples bonded to paint were weathered at 97 kLy; following removal, no residues were to be seen on the surface or in the edge region.

EXAMPLE 4

The protective film is produced by coextrusion of three layers including the adhesive. The base layer consists of the raw materials described in Example 3. The adhesive is a polymer consisting of 50 mol-% ethylene, 20 mol-% 1-butene and 30 mol-% propene, and is granulated and then powdered with amorphous silica. The Mooney viscosity is 20.

The extruder for the base layer was charged with the raw materials set out in Example 3, that for the adhesive layer with the granulated powdered terpolymer, and the extruder for the in-between adhesion promoter layer with a mixture of 60 parts by weight of recycled protective film from Example 3 and 40 parts by weight of granulated adhesive from this example.

The bond strength of the resulting protective film on steel is 0.4 N/cm and on paint 0.33 N/cm (fresh) and 2.1 N/cm (following storage under alternating climatic conditions). The protective film was bonded to freshly painted metal panels (two-component PU paint) and peeled off after a week; no paintwork deformation was in evidence.

Bonded metal panels of the same type were subjected to UV ageing (1750 h of Xenotest 150, corresponding to 97 kLy). Following the removal of the protective film no residues are in evidence even in the edge region. Samples bonded to paint were weathered at 97 kLy; following removal, no residues could be seen on the surface or in the edge region.

COMPARATIVE EXAMPLE 1

Preparation is as in Example 1. The pressure-sensitive adhesive employed is a copolymer consisting of 80 mol-% ethylene and 20 mol-% 1-butene. The solvent used was hot toluene. The bond strength on paint is 0.2 N/cm (fresh) and 4.9 N/cm (following storage under alternating climatic conditions). The protective film tears when peeled off from the painted metal panel when pulling on one corner of an extensive bond. A protective film in accordance with this example exhibits severe paintwork deformation.

COMPARATIVE EXAMPLE 2

As Comparative Example 1, but the copolymer consists of 90 mol-% ethyl ene and 10 mol-% 1-butene. Hot toluene is required as the solvent. The bond strength on painted metal and on steel is less than 0.1 N/cm.

COMPARATIVE EXAMPLE 3

As Example 1, but with a terpolymer of 80 mol-% ethylene and 10 mol-% each of propene and 1-butene. The bond strength on paint is 0.5 N/cm (fresh) and 4.2 N/cm (following storage under alternating climatic conditions). The protective film according to this example exhibits severe paintwork deformation.

COMPARATIVE EXAMPLE 4

As Example 1, but with a copolymer of 70 mol-% vinyl acetate and 30 mol-% ethylene. The bond strength on steel is 1.0 N/cm, on paint 0.9 N/cm (fresh) and 3.6 N/cm (following storage under alternating climatic conditions). When bonded to fresh paint, severe deformations are observed.

COMPARATIVE EXAMPLE 5

Preparation is as in Example 1, with the adhesive employed being a mixture of polyisobutylenes; 25 parts by weight have a molecular weight $M_W$ of 1.2 million, 75 parts by weight an $M_W$ of 35,000. The bond strength on paint is 0.6 N/cm (fresh) and 1.8 N/cm (following storage under alternating climatic conditions). Samples bonded to paint were weathered with 97 kLy; following their removal, only slight residues were to be seen on the surface but very severe residues in the edge region. When bonded to fresh paint, slight paintwork deformations are in evidence in the edge region.

What is claimed is:

1. A method for protecting the paint finish of a vehicle or for protecting a painted vehicle component against soiling and damage during assembly, transportation or storage, said method comprising applying to said vehicle or vehicle component a self-adhesive protective film, said self-adhesive protective film comprising:

a) a backing film; and b) an adhesive composition coated on said backing film, wherein the adhesive composition comprises a copolymer of at least two different α-olefins having 2 to 12 carbon atoms and at least one further comonomer, said adhesive composition not containing 75 mol-% or more of any single α-olefin;

wherein the UV permeability of the self-adhesive protective film in the range from 290 to 400 nm is below 1%; and the bond strength of the self-adhesive protective film on steel is between 0.2 and 2.8 N/cm.

2. The method according to claim 1, wherein the self-adhesive protective film comprises polar comonomers in the copolymer, and the proportion of said polar comonomers in the copolymer is below 20 mol-%.

3. The method according to claim 1, wherein the self-protective adhesive film comprises at least one light stabilizer.

4. The method according to claim 3, wherein the at least one stabilizer is selected from the HALS class of light stabilizers.

5. The method according to claim 1, wherein the self-protective adhesive film comprises no α-olefin in a proportion of more than 65 mol-% in the copolymer.

6. The method according to claim 1, wherein the self-protective adhesive film exhibits a bond strength on steel between 0.3 and 1.5 N/cm.

7. The method according to claim 1, wherein the proportion of each α-olefin in the copolymer is between 5 and 60 mol-%.

8. The method according to claim 1, wherein the UV permeability of the self-adhesive protective film in the range from 290 to 400 nm is below 0.1% and the backing film thereof comprises one or more light stabilizers in an amount of at least 0.15% by weight.

9. The method according to claim 1, wherein the self-adhesive protective film comprises an adhesion promoter between the backing film and the adhesive composition.

10. The method according to claim 9, wherein the adhesion promoter comprises at least one polymer which consists to the extent of at least 50 mol-% of one or more α-olefins.

11. The method according to claim 1, wherein the self-adhesive protective film exhibits a force at 10% extension which does not exceed 25 N/15 mm width either in the lengthwise or transverse direction.

12. The method according to claim 1, wherein the self-adhesive protective film comprises a backing film which comprises at least one propylene copolymer.

13. The method according to claim 1, wherein the self-adhesive protective film is formed by simultaneous coextrusion of the adhesive composition and the backing film.

14. The method according to any one of claims 1–13, which comprises applying the self-adhesive protective film to curved surfaces on an exterior portion of said vehicle.

15. The method according to claim 14, which comprises applying the self-adhesive protective film to a painted surface of said vehicle before said vehicle is assembled.

* * * * *